US005665244A

United States Patent [19]
Rothenberg et al.

[11] Patent Number: 5,665,244
[45] Date of Patent: Sep. 9, 1997

[54] REDUCTION OF IMPURITIES IN BAYER PROCESS ALUMINA TRIHYDRATE

[75] Inventors: Alan Rothenberg, Wilton, Conn.; Greg Flieg, Prairieville, La.; Robert Cole, Portland, Tex.

[73] Assignee: Cytec Technology Corporation, Wilmington, Del.

[21] Appl. No.: 746,037

[22] Filed: Nov. 6, 1996

Related U.S. Application Data

[60] Provisional application No. 60/006,254 Nov. 7, 1995.

[51] Int. Cl.⁶ ........................... C01F 7/20
[52] U.S. Cl. .......... 210/734; 210/772; 210/787; 423/121; 423/122; 423/131
[58] Field of Search ............. 209/5; 210/725, 210/727, 728, 734, 772, 787; 423/111, 121, 122, 130, 131

[56] References Cited

U.S. PATENT DOCUMENTS

| 2,981,600 | 4/1961 | Porter | 23/143 |
|---|---|---|---|
| 3,345,344 | 10/1967 | Fetscher et al. | 260/78.4 |
| 3,607,140 | 9/1971 | Miller et al. | 23/301 R |
| 3,860,688 | 1/1975 | Beadle et al. | 423/131 |
| 4,480,067 | 10/1984 | Vio et al. | 524/446 |
| 4,532,046 | 7/1985 | Meunier et al. | 210/698 |
| 4,536,296 | 8/1985 | Vio | 252/8.5 C |
| 4,560,541 | 12/1985 | Davis | 423/126 |
| 4,587,306 | 5/1986 | Vio et al. | 525/354 |
| 4,614,642 | 9/1986 | Cristol et al. | 423/127 |
| 4,767,540 | 8/1988 | Spitzer et al. | 210/728 |
| 4,902,751 | 2/1990 | Lewellyn et al. | 525/340 |
| 5,128,420 | 7/1992 | Domb et al. | 525/377 |
| 5,133,874 | 7/1992 | Spitzer et al. | 210/734 |
| 5,451,329 | 9/1995 | Bode et al. | 210/728 |
| 5,516,435 | 5/1996 | Lewellyn | 210/728 |
| 5,534,235 | 7/1996 | Reed et al. | 423/121 |
| 5,539,046 | 7/1996 | Lewellyn | 210/733 |
| 5,601,726 | 2/1997 | Cole | 210/727 |

OTHER PUBLICATIONS

Daniel E. Sullivan and P. Aarne Vesilind, Operations Forum "Centrifuge Trade-Offs," pp. 24–27.

Wolfgang Gerhartz, Ullmann's Encyclopedia of Industrial Chemistry, Fifth Completely Revised Edition, pp. 9-3, 11-1—11-27.

*Primary Examiner*—Peter A. Hruskoci
*Attorney, Agent, or Firm*—Claire M. Schultz

[57] ABSTRACT

Processes for reducing the level of impurities in alumina trihydrate produced in the Bayer process are disclosed, wherein alumina trihydrate-containing process streams are flocculated with hydroxamated polymers and centrifuged.

10 Claims, No Drawings

REDUCTION OF IMPURITIES IN BAYER PROCESS ALUMINA TRIHYDRATE

This application claims the benefit of U.S. Provisional application No.: application Ser. No.: 60/006,254 filing date Nov. 7, 1995.

FIELD OF THE INVENTION

The present invention is directed to a process of alumina manufacture via the Bayer process. More particularly, it is concerned with reducing the level of impurities, especially soda, in alumina trihydrate produced in the Bayer alumina process by contacting an alumina trihydrate-containing process stream with a polymer which contains hydroxamic acid groups or salts thereof, to thereby flocculate alumina trihydrate, and subjecting the resultant flocculated alumina trihydrate to centrifugation.

BACKGROUND OF THE INVENTION

The almost universally used process for the manufacture of alumina is the Bayer process. In a typical commercial Bayer process, raw bauxite ore is pulverized to a finely divided state. The pulverized ore is then fed to a slurry mixer where a slurry is prepared using water, spent liquor and added caustic. This bauxite slurry is then diluted and sent through a series of digesters where, at about 300°–800° F. and 100–2000 p.s.i., most of the total available alumina is extracted from the ore which may contain both trihydrate and monohydrate forms of alumina. The effluent from the digesters passes through a series of flash tanks wherein heat and condensate are recovered as the digested slurry is cooled to about 230° F. and brought to atmospheric pressure. The aluminate liquor leaving the flashing operation (blow-off discharge) contains about 1–20% solids, which consist of the insoluble residues that remain after reaction between the bauxite ore and basic material used to digest the ore and the insoluble products which precipitate during digestion. Herein, all percentages are by weight, based on total weight, unless otherwise stated. The coarser solid particles are then generally removed with a "sand trap" cyclone. To separate the finer solid particles from the liquor, the slurry is normally fed to the center well of a primary mud settler where it is treated with a flocculant such as a polyacrylamide polymer, polyacrylate polymer, hydroxamated polymer, flour and/or starch. As the mud settles, clarified sodium aluminate solution, referred to as "green" or "pregnant" liquor, overflows a weir at the top of the mud settling tank and is passed to the subsequent process steps. The settled solids ("red mud") are withdrawn as underflow from the bottom of the primary mud settler and passed through a countercurrent washing circuit, generally comprised of a series of washers, for recovery of sodium aluminate and soda. Aluminate liquor overflowing the primary settler still contains typically 50 to 200 milligrams (mg) of suspended solids per liter. This liquor is then generally further clarified by filtration to give a filtrate with less than about 10 mg suspended solids per liter of liquor.

The aluminate liquor filtrate is typically cooled and muted to a precipitator, where seeding of the liquor may take place. A series of precipitators may be used. Alumina, in relatively pure form, is then precipitated from the filtrate as alumina trihydrate crystals. The alumina trihydrate suspension, or slurry, may then be fed to a series of decanters, or classifiers, which classify the trihydrate according to particle size. Ordinarily, some of the classifier exit streams are product streams and some are seed streams. For instance, underflow from the primary classifier is typically a product stream. Overflow from the primary classifier may be a feed stream for a secondary classifier, the underflow of which may be a product stream or a seed stream, or both. Secondary classifier overflow is typically a feed stream for a tertiary classifier, or tertiary thickener, the underflow of which is usually a seed stream, and the overflow of which is generally routed back to the ore digester. The trihydrate crystals suspended in the classifier product streams are generally washed in a hydrate tank and filtered to remove soda (sodium salts e.g. $Na_2O$ and NaOH) and other impurities. The resulting trihydrate filter cake is then dried and calcined to give alumina trihydrate product that is suitable for commercial purposes. The seed streams from the classifiers, which tend to contain smaller trihydrate crystals than the product streams, are usually routed back to the precipitators to supply seed crystals for subsequent precipitations. The remaining liquid phase or spent liquor is returned to the initial ore digestion step and employed as a digestant of additional ore after being reconstituted with additional caustic.

U.S. Pat. No. 4,614,642 discloses a method of producing alumina trihydrate in which an alumina trihydrate suspension is subjected to a separating method, which may be chosen from the group comprising decanting, cycloning, filtering, and/or centrifuging, to produce a fraction containing fine particles. The fraction containing the fine particles is then subjected to a known type of treatment, including partially dissolving the fine particles or chemical agglomeration of the fine particles, so as to reduce their number by at least 50%.

Because of the rheological characteristics of the classifier streams, centrifugation is not typically used to separate suspended trihydrate from product or seed streams. Instead, separation of the solids is generally accomplished by the use of filters and/or other classifiers. Classifiers rely on the gravitational settling of the solids to achieve separation. Polymer flocculant may be added to some streams to increase the efficiency of separation. Flocculation of the solids aids in the settling process by tending to agglomerate smaller particles into larger ones, which tend to settle faster. Flocculation also aids in the filtering process because larger agglomerates are easier to filter than smaller ones, and less likely to plug the filtering means. Dewatering aids such as those described in U.S. Pat. No. 5,451,329 may also be added to the classifier streams to reduce the water level in the filter cake.

Because the alumina is formed in a sodium hydroxide environment, it generally contains a significant amount of soda (typically 0.3% to 0.4% for product alumina) as well as other impurities. The total soda is present as leachable soda, which can be removed by washing, and nonleachable soda, which cannot normally be removed by washing because it is contained within the alumina trihydrate crystals. For most alumina uses, such as electrolytic production of aluminum metal or formation of ordinary ceramic products, the alumina is usable even with these high levels of impurities. For a number of other applications, however, these impurity levels (particularly high soda and silica levels) are unacceptable. These applications include products intended for such uses as synthetic sapphire and as translucent bodies. Also, since the soda in the alumina is not available to be recycled back into the Bayer process, it must be replaced in the process at significant additional cost.

Much effort has been devoted to producing alumina with reduced levels of impurities, including soda. In U.S. Pat. No. 4,560,541, a process is described which involves, inter alia, reacting alumina with hydrochloric acid and adding water to dissolve the aluminum-containing reaction product, then separating the solution from the insoluble impurities by such methods as centrifugation and filtration. The removal of iron-containing impurities is taught in U.S. Pat. No. 3,607,140, which process involves the separation of iron-containing alumina hydrate by running the moving stream through a liquid cyclone, centrifuge, filter, or the like. The removal of organic impurities from spent liquor by concentrating a solution to precipitate the organic residues, then filtering or centrifuging to remove the precipitates, is revealed in U.S. Pat. No. 2,981,600. In none of these three patents was a polymer flocculant utilized.

A reduction in the turbidity of Bayer process liquors containing a cationic polymer-humate complex was achieved in U.S. Pat. No. 5,133,874 by adding a second cationic polymer to flocculate the complex and separating the flocculated polymer-humate complex by filtration, centrifugation or like. The flocculation and separation take place before the alumina trihydrate is precipitated, so the polymers are removed by the separation process and are not available to flocculate the subsequently precipitated alumina trihydrate.

Polymers containing hydroxamic acid groups for flocculation of suspended solids in Bayer process streams are described in U.S. Pat. No. 4,767,540, which is hereby incorporated herein by reference. This patent does not disclose the use of centrifugation in combination with the use of these polymers.

Surprisingly, it has now been discovered that the level of soda in alumina trihydrate is lower when polymer flocculants which contain hydroxamic acid groups are used in combination with centrifugation to dewater alumina trihydrate suspensions, than when centrifugation alone is used.

The processes of the present invention are designed to reduce the level of soda and other impurities in alumina trihydrate made by the Bayer process. The improvement forming the basis of the present invention lies in the centrifugation of alumina trihydrate crystals that have been flocculated using polymers that contain hydroxamic acid groups, as compared to centrifugation of trihydrate crystals that were not flocculated with such polymers.

DETAILED DESCRIPTION OF THE PREFERRED EMBODIMENTS

According to the present invention, there is provided a process for reducing the levels of impurities, particularly soda, in alumina trihydrate made by the Bayer process whereby a polymer containing hydroxamic acid groups or salts thereof is added to a suspension of alumina trihydrate to flocculate the trihydrate, and the resulting flocculated solids are dewatered by centrifugation.

The hydroxamated polymer to be employed in the present invention can vary rather broadly in type. It should be sufficiently stable to be effective under the process conditions used, e.g., high temperatures and strong caustic conditions, typically, 185°–225° F., and 80–400 grams per liter total alkali content (expressed as sodium carbonate equivalent).

Thus, for example, any water-soluble hydroxamic acid or salt group-containing polymer may be used in the process of the present invention. The useful polymers can best be exemplified by those containing pendant groups of the Formula (1):

wherein R is hydrogen or a cation. These polymers are well known in the art and can be derived from polymers containing pendant ester, amide, anhydride, nitrile, etc., groups by the reaction thereof with a hydroxylamine or its salt, or by polymerization of a monomer which contains a hydroxamic acid or salt group. Hydroxamated polymers derived from polymers containing amide groups e.g. polyacrylamides are preferred.

Exemplary of the polymers which may be hydroxamated for use in the process of the present invention are acrylic, methacrylic, crotonic etc., acid ester polymers such as polymers produced from the polymerization of methyl acrylate, ethyl acrylate, t-butyl acrylate, methyl methacrylate, ethyl methacrylate, cyclohexyl methacrylate, dimethyl aminoethyl methacrylate, dimethyl aminoethyl acrylate, methyl crotonate, etc., polymers of maleic anhydride and esters thereof, and the like; nitrile polymers such as those produced from acrylonitrile etc; amide polymers such as those produced from acrylamide, methacrylamide and the like.

Hydroxamated polymers are well known to those skilled in the art and are specifically disclosed, as are methods for their production, in U.K. Patent Application 2171127 and U.S. Pat. Nos. 3,345,344; 4,480,067, 4,532,046; 4,536,296; 4,587,306; 4,767,540; 4,902,751; and 5,128,420; all of which are hereby incorporated herein by reference. Generally, these hydroxamated polymers may be produced by reacting the polymer containing the pendant reactive group, in solution, with a hydroxylamine or its salt at a temperature ranging from about 10° C. to 100° C., preferably below about 50° C., for several hours, more preferably at a pH over about 10. From about 1–90% of the available pendant reactive groups of the polymer may be replaced by hydroxamic groups in accordance with said procedures.

In addition to reaction of a hydroxylamine or its salt with a polymer solution, it is known that a polymer latex may be reacted directly with a hydroxylamine or its salt. The latex may be, e.g., a copolymer of acrylamide and methyl acrylate or a copolymer of acrylic acid and methyl acrylate. In these cases, the hydroxylamine or its salt reacts primarily with the ester groups to form hydroxamic acid groups.

Also, it is known that aqueous solutions of polymers derived from inverse emulsions and inverse microemulsions (herein referred to also as emulsions and microemulsions) function efficiently in the process of the present invention. These emulsions and microemulsions are made of, for example, aqueous polyacrylamide, or acrylamide/acrylic acid copolymer solutions dispersed in oil and reacted directly with a hydroxylamine or its salt to give very high molecular weight polymers containing hydroxamic acid groups. Dilute aqueous solutions of these polymers, useful in the instant invention, are derived from emulsions and microemulsions by "breaking"; e.g. adding the emulsions and microemulsions to water, optionally in the presence of a breaker surfactant, and agitating to dissolve the polymer.

The degree of hydroxamation, i.e., the concentration of Formula I units in the polymers useful herein, may range from about 1 to about 90 mole percent, preferably from about 5 to about 85 mole percent, more preferably from about 20 mole percent to about 80 mole percent, and most preferably from about 25 to about 70 mole percent. The degree of hydroxamation may be determined by nuclear magnetic resonance spectroscopy techniques well known to those skilled in the art.

Suitable hydroxylamine salts include the sulfates, sulfites, phosphates, perchlorates, hydrochlorides, acetates propionates and the like. The pH of the solution is adjusted to be in the range of about 3 to about 14, preferably over about 7, and more preferably over about 10, by means of acid or base addition to the solution.

Any water-soluble polymer may be used in the present process which, after hydroxamation, performs to settle suspended alumina trihydrate solids. Thus, homopolymers, copolymers, terpolymers, etc. of the above exemplified monomers may be used. Suitable comonomers which, by copolymerization with the above monomers, may form, for example, up to about 95 mole percent of the polymers useful herein can include acrylic acid, sodium acrylate, methacrylic acid, maleic anhydride, vinyl acetate, vinyl pyrrolidone, butadiene, styrene as well as others of the above enumerated esters, amides and/or nitriles and the like as is known in the art and is set forth in the above-incorporated patents as long as such copolymers, terpolymers etc., are water-soluble after hydroxamation. The weight average molecular weight of the polymers useful in the process of the present invention range from about $1\times10^4$ to about $1\times10^8$, preferably from about $3\times10^5$ to about $5\times10^7$. Weight average molecular weight may be determined by light scattering techniques well known to those skilled in the art.

The polymers used in the present invention are employed by adding them, usually in the form of a dilute aqueous solution, to the liquor containing suspended alumina trihydrate solids in an amount at least sufficient to settle said suspended solids. Generally, for best results, at least about 0.1 milligram (mg) of hydroxamated polymer per liter of alumina trihydrate suspension is added.

It is understood, that higher amounts than those just stated may be employed without departing from the scope of the invention, although generally a point is reached in which additional amounts of hydroxamated polymer do not improve the separation rate over already achieved maximum rates. Thus, it is uneconomical to use excessive amounts when this point is reached.

The technology of centrifugation is well known to those skilled in the art and a detailed description may be found in e.g. Ullman's Encyclopedia of Industrial Chemistry, Volume B2, pp. 11–1 to 11–27, which is hereby incorporated herein by reference. Any centrifuge, including filter centrifuges, screen centrifuges, sedimentation centrifuges, decanting centrifuges, etc. may be used in the present invention. Sedimentation and decanting centrifuges are preferred, and classifying decanter centrifuges are most preferred.

The optimization of centrifuge performance is well known In the art e.g. D. E. Sullivan and P. A. Vesiland, "Centrifuge Trade-Offs", Operations Forum, pp. 24–27 (1986), which is hereby incorporated herein by reference. Feed volume depends on the size of the centrifuge and type of centrifuge. For a horizontal classifying decanter centrifuge with a bowl diameter of about 20 inches and a length of about 80 inches, a feed volume of about 4 to about 250 gallons per minute may be used, preferably about 20 to about 200 gallons per minute. Feed solids may range from about 1% to about 40%, preferably from about 5% to about 15%. The G-force is generally in the range of about 300 to about 2000×G, preferably in the range of about 500 to about 1000×G. The differential between the scroll and the bowl is generally less than 150 revolutions per minute (rpm), preferably from about 1 to about 100 rpm, more preferably from about 5 to about 50 rpm, most preferably from about 10 to about 40 rpm.

Water-soluble polymers containing pendant hydroxamic acid or salt groups are generally mixed with the alumina trihydrate suspension in a holding tank prior to being introduced to the centrifuge, or pumped into the process stream feed line, or added via a feed tube directly inside the centrifuge. The alumina trihydrate suspension may be any Bayer process stream which contains precipitated trihydrate e.g. precipitator stream, primary classifier underflow, primary classifier overflow, secondary classifier underflow, secondary classifier overflow, tertiary thickener underflow, tertiary thickener overflow, hydrate tank stream, etc. Preferred process streams are underflow from the primary classifier, hydrate tank stream, and overflow from the secondary classifier. Preferably, the polymer is added in the form of a dilute solution, e.g. from about 0.01% to about 3%, directly inside the centrifuge. Those skilled in the art recognize that the optimum polymer concentration in the dilute solution depends on the alumina solids level in the Bayer process stream, and can be ascertained by routine experimentation.

When hydroxamated polymers are used, preferably within the ranges specified above, to flocculate suspended trihydrate solids, the flocculated solids may be centrifuged to produce centrifuged solids (cake) and aqueous liquid, preferably when the operation of the centrifuge is optimized according to principles well known in the art. The cake solids (the weight percent solids of the centrifuged solids) is greater than the feed solids, preferably greater than about 40%, more preferably greater than about 50%, most preferably greater than about 60%. Although is it generally preferred for the solids level to be as high as possible, plugging of the centrifuge may occur at very high solids levels e.g. 90%. For obvious reasons plugging of the centrifuge is to be avoided.

It is desirable for the levels of impurities in the centrifuged alumina trihydrate to be as low as possible. Centrifugation of flocculated trihydrate crystals may be performed at any stage of the process, so the impurity level in the centrifuged trihydrate depends on the process stream being centrifuged. For instance, a seed stream from the underflow of a tertiary thickener may be centrifuged to reduce the level of soda and other impurities in the, trihydrate crystals before the crystals are returned to the precipitator. In this case, leachable soda levels below 10% are desirable and are generally obtained by the processes of this invention, preferably below 8%, most preferably below 5%.

In the case of product streams, the alumina trihydrate is typically washed in a hydrate tank before filtration and calcining. Flocculation and centrifugation of the hydrate tank output stream lowers the level of impurities in the alumina trihydrate. It is often desirable that the centrifuged alumina trihydrate solids be further purified by washing with wash water or another Bayer process stream to further reduce the levels of impurities. The centrifuged alumina trihydrate solids may be washed during and/or after centrifugation. Preferably, the wash water is introduced at a feed manifold of the centrifuge. The wash water may be added at any rate. Preferably, the wash water is added at a rate of from about 5% to about 100% of the feed volume, most preferably from about 10% to about 50% of the feed volume.

In practical terms, the centrifugation of flocculated alumina trihydrate solids to achieve purified, dewatered trihydrate and aqueous spent liquor is most often optimized in the context of other plant operations. For instance, the level of impurities in the dewatered trihydrate may be adjusted up or down to achieve other desirable outcomes such as lower power consumption, reduced waste disposal costs, increased rates of production, increased product purity, reduced consumption of raw materials, etc. Flocculation and centrifugation may be used in place of, or in addition to, or in combination with, the usual means of solids/liquids separation employed in the Bayer process e.g. settlers, decanters, thickeners, classifiers, and filters. A consecutive or intermittent series of centrifuges may also be employed, with the output of one as the input for another.

Other polymer flocculants that are added earlier in the Bayer process for any reason e.g. for red mud flocculation are not typically effective for alumina trihydrate flocculation. However, such other flocculants may be added in conjunction with the hydroxamated polymer flocculant to help flocculate the alumina trihydrate so that it may be centrifuged effectively.

The following examples are set forth for illustration purposes only and are not to be construed as limits on the present invention.

In the following Examples, % leachable soda in alumina trihydrate is determined by adding 50 grams of dry alumina trihydrate to 100 milliliters of standardized 0.10M hydrochloric acid, stirring to form a slurry, filtering, and back-titrating the filtrate with standardized 0.1M sodium hydroxide solution. Leachable soda is expressed as the wt. % sodium carbonate equivalent in the trihydrate.

EXAMPLE A

Polymer A is prepared as follows: 230 Parts of 30% aqueous hydroxylamine sulfate solution are combined with 2 parts of sodium thiosulfate stabilizer and 88 parts of water, and the mixture is neutralized with 160 parts of 50% aqueous sodium hydroxide. The resulting solution is added to a mixture of 179 parts aliphatic oil, 1 part ethoxylated amine surfactant, and 293 parts of a polyacrylamide microdispersion having a molecular weight of about 20,000,000 and having about 25% polymer solids. The mixture is stirred while maintaining the temperature below 35° C. for 24 hours or more. The resultant hydroxamated polymer microdispersion contains 7% polymer solids and is shown by nuclear magnetic resonance spectroscopy to contain about 65 mole % hydroxamic acid groups.

EXAMPLES 1–6

The alumina trihydrate suspension, or slurry, used in these examples is tertiary classifier underflow. The slurry is fed with a variable speed pump to a horizontal classifying decanter centrifuge having a bowl diameter of about 20 inches and a length of about 80 inches. The polymer, as a 0.125% solution, is fed directly into the feed chamber of the centrifuge via a feed tube along with wash water (where used). The G-force ranges from about 740×G to about 790×G. The differential speed ranges from about 13 rpm to about 35 rpm. Table 1 shows that the wt % leachable soda in the flocculated and centrifuged trihydrate is less than the wt % leachable soda in trihydrate that has been centrifuged without being flocculated with the polymer, with or without wash water. Table 1 also shows the wt % solids of the trihydrate slurry feed, the slurry feed rate in gallons per minute (gpm), the identity of the flocculant and the dosage of the flocculant, in units of grams of real polymer per dry ton of flocculated solids (g/T). The feed rate of the wash water (where used) is about 18 gpm.

TABLE 1

| Example No. | Hydrate Slurry Solids, Wt. % | Hydrate Slurry Feed Rate, gpm | Polymer Flocculant | Flocculant Dosage, g/T | Wash Water | Leachable Soda, Wt. % |
| --- | --- | --- | --- | --- | --- | --- |
| 1 | 8.1 | 165 | None | 0 | None | 9.05 |
| 2 | 7.9 | 175 | Polymer A | 25 | None | 6.19 |
| 3 | 8.4 | 50 | None | 0 | None | 8.51 |
| 4 | 10.1 | 50 | Polymer A | 26 | None | 5.20 |
| 5 | 7.8 | 50 | None | 0 | Yes | 4.74 |
| 6 | 12.1 | 50 | Polymer A | 22 | Yes | 4.35 |

EXAMPLES 7–8

The alumina trihydrate suspension used in these examples is secondary classifier overflow having a solids level of about 3% to about 4%. The trihydrate is flocculated and centrifuged as in Examples 1–6, with appropriate adjustment for the lower feed solids. The wt % leachable soda in the flocculated, centrifuged trihydrate is less than the wt % leachable soda in trihydrate that has been centrifuged under substantially the same conditions, but without being flocculated with the polymer (Comparative Example 8).

EXAMPLE 9–10

The alumina trihydrate suspension used in these examples is output from a hydrate tank having a solids level of about 40%. The trihydrate is flocculated and centrifuged as in Examples 1–6, with appropriate adjustment for the higher feed solids. The wt % leachable soda in the flocculated, centrifuged trihydrate is less than the wt % leachable soda in trihydrate that has been centrifuged under substantially the same conditions, but without being flocculated with the polymer (Comparative Example 10).

We claim:

1. A process for reducing alumina trihydrate impurity levels in the Bayer process by centrifugation, comprising contacting and efficiently mixing an alumina trihydrate suspension containing leachable soda with a water-soluble polymer containing pendant hydroxamic acid or salt groups in an amount effective to flocculate the suspended solids therein, said polymer having a molecular weight ranging from about $1 \times 10^4$ to about $1 \times 10^8$ and a degree of hydroxamation ranging from about 1 to about 90 mole percent, and centrifuging resultant flocculated solids to thereby separate centrifuged solids containing said alumina trihydrate from said suspension, and reduce said leachable soda in the separated alumina trihydrate.

2. A process as claimed in claim 1, which further comprises washing said flocculated solids with wash water during and/or after said centrifuging.

3. A process as claimed in claim 1, wherein said polymer is derived from an acrylamide polymer.

4. A process as claimed in claim 1, wherein said polymer has molecular weight ranging from about $3 \times 10^5$ to about $3 \times 10^7$.

5. A process as claimed in claim 1, wherein the degree of hydroxamation of said polymer ranges from about 20 to about 80 mole percent.

6. A process as claimed in claim 1, wherein the degree of hydroxamation of said polymer ranges from about 25 to about 70 mole percent.

7. A process as claimed in claim 1, wherein said alumina trihydrate suspension is classifier underflow.

8. A process as claimed in claim 1 wherein said alumina trihydrate suspension is classifier overflow.

9. A process as claimed in claim 1, wherein said polymer is derived from an emulsion.

10. A process as claimed in claim 1, wherein a decanting centrifuge is used for said centrifuging.

* * * * *